United States Patent
Huang et al.

(10) Patent No.: US 10,230,463 B2
(45) Date of Patent: Mar. 12, 2019

(54) TRANSMISSION DEVICE AND METHOD FOR MEASURING OPTICAL TRANSMISSION CHARACTERISTICS

(71) Applicant: FUJITSU LIMITED, Kawasaki-shi, Kanagawa (JP)

(72) Inventors: Guoxiu Huang, Inagi (JP); Yasuhiko Aoki, Yokohama (JP); Shoichiro Oda, Fuchu (JP); Zhenning Tao, Beijing (CN); Setsuo Yoshida, Inagi (JP); Kyosuke Sone, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/227,580

(22) Filed: Aug. 3, 2016

(65) Prior Publication Data
US 2017/0047993 A1   Feb. 16, 2017

(30) Foreign Application Priority Data
Aug. 10, 2015   (JP) ................. 2015-158419

(51) Int. Cl.
  *H04B 10/079*   (2013.01)
  *H04B 10/548*   (2013.01)
  *H04B 10/077*   (2013.01)
(52) U.S. Cl.
  CPC ... *H04B 10/07955* (2013.01); *H04B 10/0775* (2013.01); *H04B 10/548* (2013.01)

(58) Field of Classification Search
  CPC .............. H04B 10/07955; H04B 10/548
  See application file for complete search history.

(56) References Cited

U.S. PATENT DOCUMENTS

| | | | | |
|---|---|---|---|---|
| 5,477,368 A | * | 12/1995 | Eskildsen | H04B 10/2537 359/334 |
| 2011/0236017 A1 | * | 9/2011 | Ohlen | H04J 14/0282 398/34 |
| 2014/0205281 A1 | | 7/2014 | Sone et al. | |
| 2017/0005723 A1 | * | 1/2017 | Prause | H04B 10/0793 |

FOREIGN PATENT DOCUMENTS

| JP | 2004-364033 A | 12/2004 |
|---|---|---|
| JP | 2014-143614 A | 8/2014 |

* cited by examiner

*Primary Examiner* — Mina M Shalaby
(74) *Attorney, Agent, or Firm* — Fujitsu Patent Center

(57) ABSTRACT

A transmitter generates a frequency-modulated CW light so as to transmit it to a path. A receiver receives the CW light that has passed through passband filters included in the path. The receiver includes a processor. The processor measures an optical power of the received CW light every time a center frequency of the CW light is changed and transmitted by the transmitter. The processor calculates transmission characteristics of the CW light that has passed through the passband filters, on the basis of an average value of the optical power that corresponds to a center frequency of the CW light and on the basis of an amplitude component that indicates an amount of change in the optical power, the average value and the amplitude component being obtained as a result of the measurement.

6 Claims, 13 Drawing Sheets

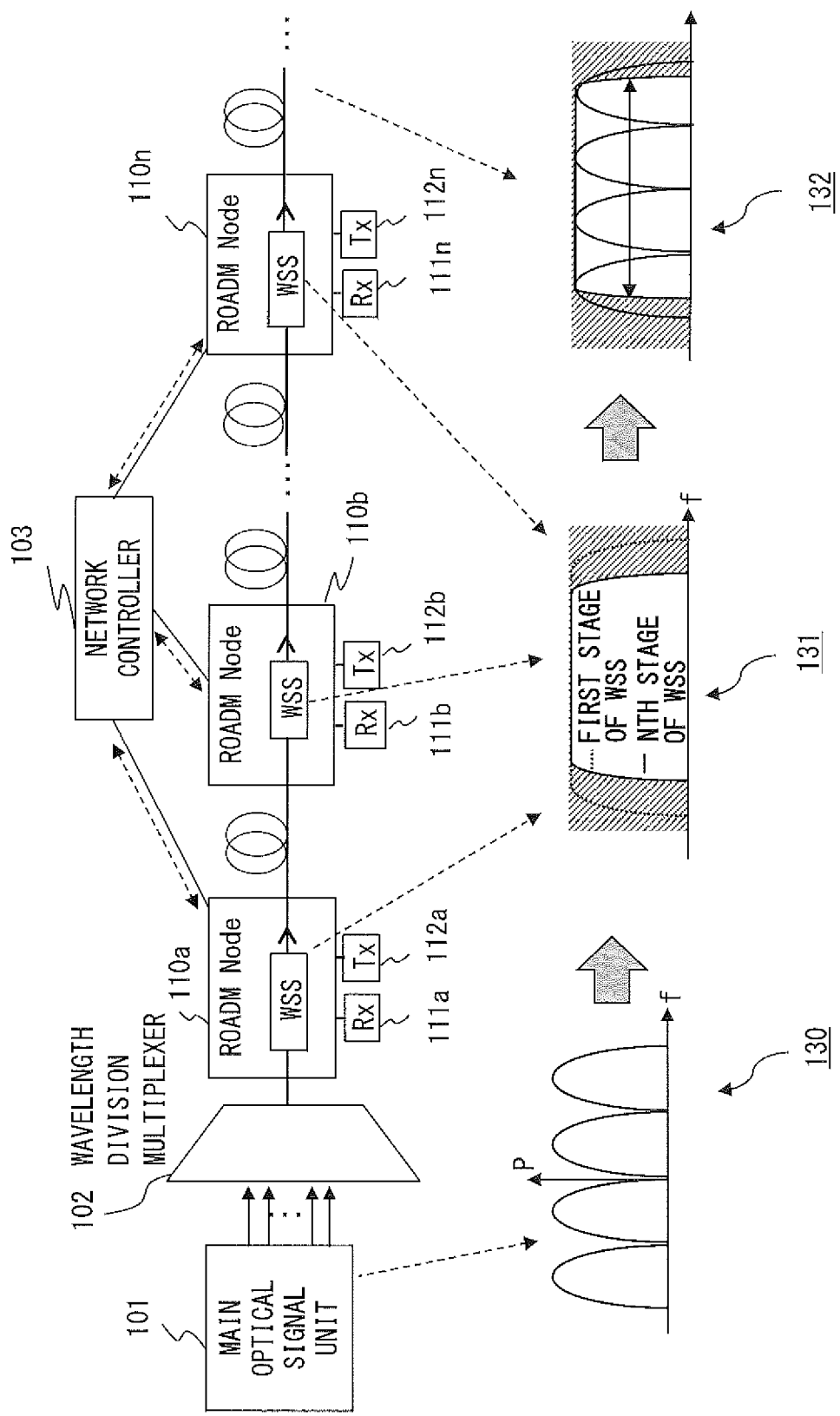
F I G. 2

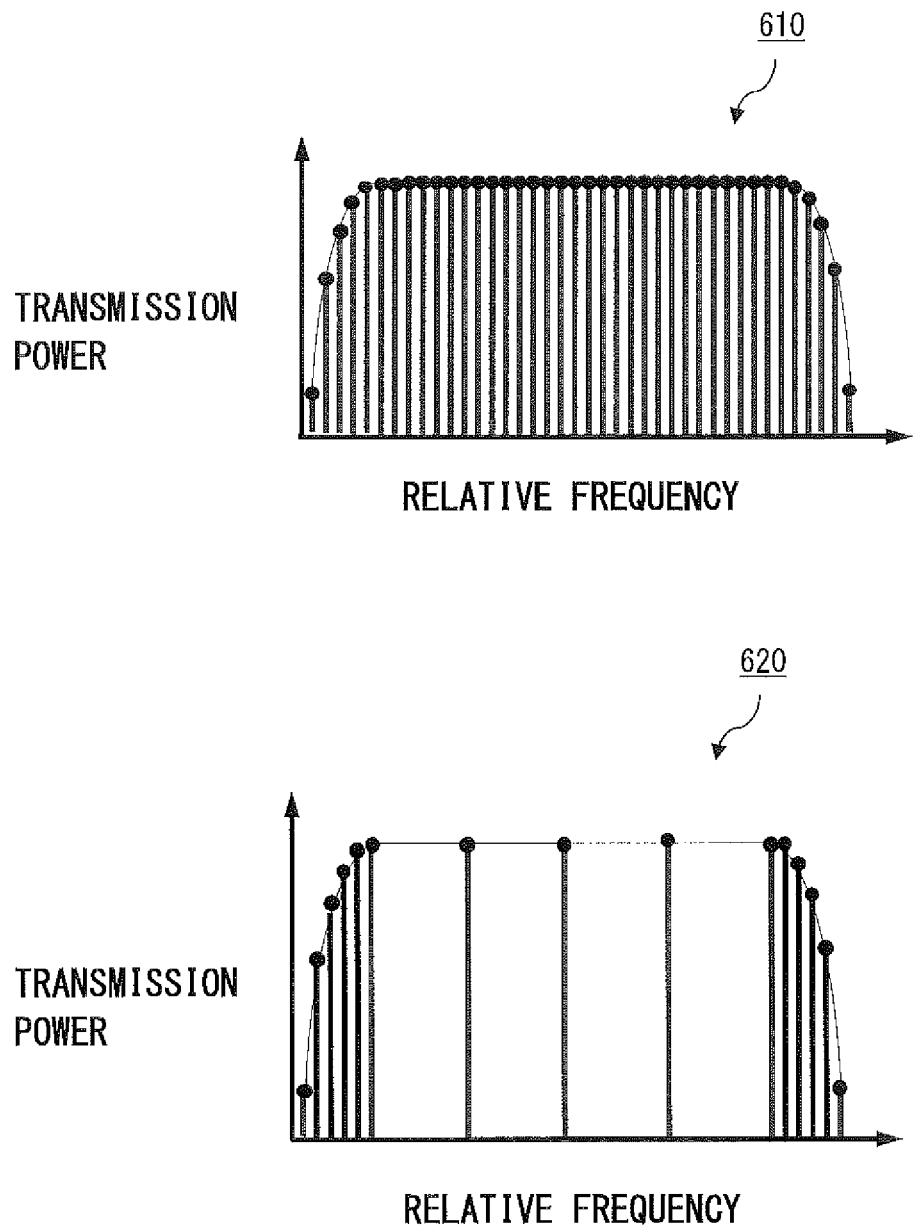
F I G. 1 0

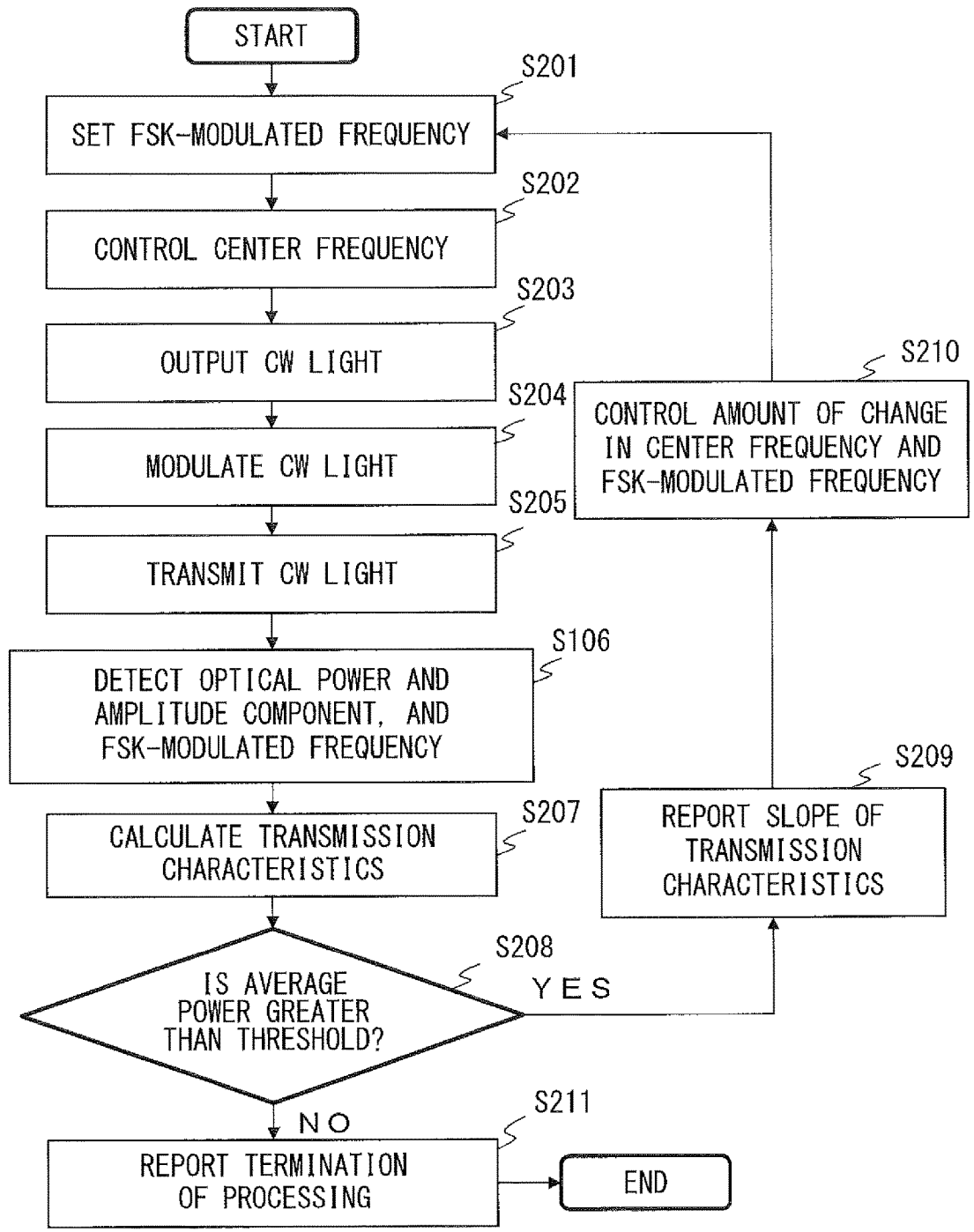
F I G. 1 3

TRANSMISSION DEVICE AND METHOD FOR MEASURING OPTICAL TRANSMISSION CHARACTERISTICS

CROSS-REFERENCE TO RELATED APPLICATION

This application is based upon and claims the benefit of priority of the prior Japanese Patent Application No. 2015-158419, filed on Aug. 10, 2015, the entire contents of which are incorporated herein by reference.

FIELD

The embodiments discussed herein are related to a measurement of optical transmission characteristics.

BACKGROUND

A wavelength division multiplex is a high-speed and high-volume communication method that places a plurality of main optical signals of different wavelengths onto one optical fiber at the same time. As a technology that operates a high-speed and high-volume transmission network, a ROADM (reconfigurable optical add/drop multiplexer) is known that combines the wavelength division multiplex with a technology of a path management. The ROADM is a multiplexing system that adds and drops a reconfigurable main optical signal. In a ROADM system, ROADM nodes connected to a network are connected to one another in a ring using an optical fiber. Each ROADM node can drop a main optical signal of an arbitrary wavelength from a wavelength division multiplexed main optical signal and, conversely, it can add light of an arbitrary wavelength to a wavelength-division-multiplexed main optical signal. Accordingly, it is possible to extract a frame of a path without a conversion into an electrical signal, which permits a flexible path management while maintaining a high-speed transmission rate.

A ROADM node includes a WSS (wavelength selective switch) function that can output an input main optical signal into a different output port for each wavelength. When a WSS (wavelength selection) is performed in each ROADM node, PBN (passband narrowing) in which a transmission-path transmission band in a main optical signal becomes narrower occurs.

The transmission characteristics of light due to the occurrence of PBN vary according to a route (a path) in a transmission path. Further, the transmission characteristics of light in a multivendor network are also unknown, and there is also a possibility that the quality of a main optical signal will be deteriorated. If the transmission characteristics in a plurality of paths are measured in advance, it is possible to avoid, for example, the deterioration of the quality of a main optical signal. The transmission characteristics can be obtained from a power loss of light transmitted through the transmission path.

Regarding an optical multiplexing transmission system, a technology is known that evaluates a difference in wavelength between a transmission side and a reception side. Using a synchronization signal as a timing reference for a data acquisition, a processor extracts an intensity change component from an electrical signal obtained by a conversion performed by a receiver, so as to obtain a time waveform. On the basis of the time waveform, a waveform evaluator calculates a shift direction and a shift amount of an optical wavelength that are caused by a transmission performed from the transmission side to the reception side (see, for example, Patent Document 1).

A method for monitoring a transmission wavelength range of a wavelength tunable optical filter is known. A technology is known that monitors whether the transmission wavelength characteristics of a tunable wavelength filter of, for example, a WSS are properly controlled in an optical wavelength division multiplexing system. An optical signal light itself is frequency modulated, and an input/output power of an optical filter to be measured is measured through a variable bandpass filter, so as to obtain the transmission wavelength characteristics of a tunable wavelength filter from both monitoring results (see, for example, Patent Document 2).

Patent document 1: Japanese Laid-open Patent Publication No. 2004-364033
Patent document 2: Japanese Laid-open Patent Publication No. 2014-143614

When a transmission-path transmission band in a main optical signal is measured, for example, a transmission (a light source) side sweeps a center frequency of a CW (continuous wave) light in a frequency band to be measured. A reception side measures a power loss of the transmitted CW light for each center frequency of the CW light, so as to obtain the transmission characteristics of the transmission path.

Here, if the transmission side finely changes the center frequency and the reception side obtains the transmission characteristics accordingly, the transmission characteristics can be measured with a high degree of accuracy. On the other hand, if the center frequency is finely changed so as to obtain the transmission characteristics, there has been a problem in which a measurement time becomes longer.

Further, if the transmission side makes the extent of change in the center frequency larger and the reception side obtains the transmission characteristics every time the center frequency is changed, the measurement time can be made shorter. However, in this case, there has been a problem in which the accuracy of the transmission characteristics is lower even though the measurement time is made shorter.

SUMMARY

A transmitter generates a frequency-modulated CW light so as to transmit it to a path. A receiver receives the CW light that has passed through passband filters included in the path. The receiver includes a processor. The processor measures an optical power of the received CW light every time a center frequency of the CW light is changed and transmitted by the transmitter. The processor calculates transmission characteristics of the CW light that has passed through the passband filters, on the basis of an average value of the optical power that corresponds to a center frequency of the CW light and on the basis of an amplitude component that indicates an amount of change in the optical power, the average value and the amplitude component being obtained as a result of the measurement.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of a 400 G system in which PBN occurs;

FIG. 10 is a diagram for explaining an example of processing performed by an optical frequency controller;

FIG. 13 is a flowchart that illustrates the example of the processing performed by the measurement device using an FSK-modulated frequency.

DESCRIPTION OF EMBODIMENTS

Figure 1:
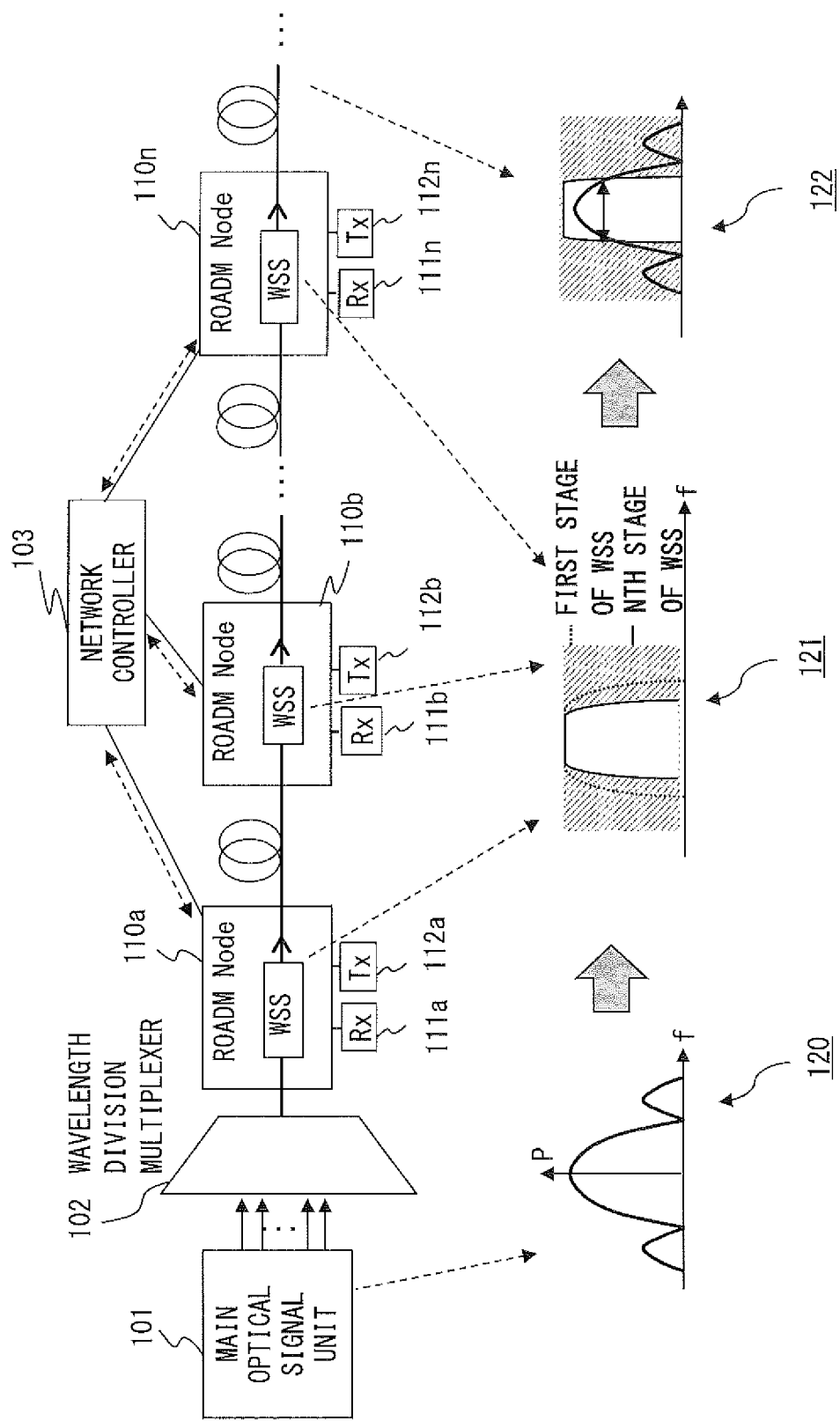
FIG. 1 illustrates an example of a 100 G system in which PBN occurs.

The transmission characteristics of light due to the occurrence of PBN vary according to a route (a path) in a transmission path. Further, the transmission characteristics of light in a multivendor network are also unknown, and there is also a possibility that the quality of a main optical signal will be deteriorated. If the transmission characteristics in a plurality of paths are measured in advance, it is possible to avoid, for example, the deterioration of the quality of a main optical signal.

When a transmission-path transmission band in a main optical signal is measured, for example, a transmission (alight source) side sweeps a center frequency of a CW light in a frequency band to be measured. A reception side measures a power loss of the transmitted CW light for each center frequency of the CW light, so as to obtain the transmission characteristics of the transmission path.

Here, if the transmission side finely changes the center frequency and the reception side obtains the transmission characteristics accordingly, the transmission characteristics can be measured with a high degree of accuracy. On the other hand, if the center frequency is finely changed so as to obtain the transmission characteristics, there has been a problem in which a measurement time becomes longer.

Further, if the transmission side makes the extent of change in the center frequency larger and the reception side obtains the transmission characteristics every time the center frequency is changed, the measurement time can be made shorter. However, in this case, there has been a problem in which the accuracy of the transmission characteristics is lower even though the measurement time is made shorter.

Thus, a measurement device according to an embodiment of the present invention includes a transmitter and a receiver. The transmitter generates a frequency-modulated CW light so as to transmit it to a path. The receiver receives the CW light that has passed through passband filters included in the path. The receiver includes a measurement unit and a calculator. The measurement unit measures an optical power of the received CW light every time the center frequency of the CW light is changed and transmitted by the transmitter. The calculator calculates transmission characteristics of the CW light that has passed through the passband filters, on the basis of an average value of the optical power that corresponds to a center frequency of the CW light and on the basis of an amplitude component that indicates an amount of change in the optical power, the average value and the amplitude component being obtained as a result of the measurement performed by the measurement unit.

If the measurement device having optical transmission characteristics according to the embodiment is used, it is possible to reduce the number of measurements and to measure optical transmission characteristics with a high degree of accuracy in less time.

Embodiments will now be described with reference to the drawings.

FIG. 1 illustrates an example of a 100 G system in which PBN occurs. A main optical signal unit 101 generates a CW light in a frequency band of 100 Gbps. A wavelength division multiplexer 102 puts together CW lights of a plurality of wavelengths included in a main optical signal and transmits them to a transmission-path side. The CW lights transmitted from the wavelength division multiplexer 102 are transmitted via a plurality of ROADM nodes 110a to 110n. The ROADMs 110a to 110n are connected to one another using a network. The ROADMs 110a to 110n do not limit the number of ROADM nodes in a system. Each ROADM node 110 includes a receiver (Rx) 111 and a transmitter (Tx) 112. The receiver 111 obtains an optical signal of an arbitrary wavelength that the ROADM node 110 obtained by dropping it from a wavelength-division-multiplexed main optical signal. The transmitter 112 includes a semiconductor laser and an external modulator. Using a CW light as an output light, the transmitter 112 can add light of an arbitrary wavelength to a wavelength-division-multiplexed main optical signal.

In each ROADM node 110, a wavelength selection is performed by use of the receiver 111 and the transmitter 112, and after that, the ROADM node 110 transmits a CW light to the next ROADM node 110. Processing of the wavelength selection (WSS) is controlled by a network controller 103.

In this case, in a main optical signal output from the main optical signal unit, a transmission-path transmission band becomes narrower every time the main optical signal passes through each of the ROADM nodes 110a to 110n (PNB). For example, a waveform of a main optical signal of 100 Gbps output by the main optical signal unit 101 is represented in an exemplary waveform 120. In the exemplary waveform 120, a vertical axis is an optical power, and a horizontal axis is a frequency of light. In the main optical signal transmitted from the main optical signal unit 101, PBN occurs every time the main optical signal passes through a ROADM node 110, and, as represented by a shaded area of an exemplary waveform 121, a frequency band surrounding an area in which an optical power is strong becomes narrower. The narrowing of a frequency band is affected by the number of ROADM nodes 110 through which the main optical signal passes, which results in an exemplary waveform 122. In a waveform of the exemplary waveform 122, the frequency band is also narrowed at a frequency of an end, in the waveform, in which the optical power of the original main optical signal in the exemplary waveform 120 was strong, and the quality of the main signal is greatly deteriorated.

Thus, the narrowing of a frequency band in PBN leads to a degradation of the transmission characteristics of a main optical signal, which results in a deterioration of the main optical signal.

FIG. 2 illustrates an example of a 400 G system in which PBN occurs. In the example of a system configuration of FIG. 2, like reference numbers are used that represent the same elements as in the system configuration of FIG. 1. The main optical signal unit 101 of FIG. 2 generates a CW light in a frequency band of 400 Gbps.

For example, an example of a subcarrier main optical signal of 400 Gbps generated by the main optical signal unit 101 is represented in an exemplary waveform 130. In the exemplary waveform 130, a vertical axis is an optical power, and a horizontal axis is a frequency of light. In the subcarrier main optical signal transmitted from the main optical signal unit 101, PBN occurs every time the subcarrier main optical signal passes through a ROADM node 110, and, as represented by a shaded area of an exemplary waveform 131, frequency bands in subcarrier areas at both sides become narrower. The narrowing of a frequency band is affected by the number of ROADM nodes 110 through which the subcarrier main optical signal passes, which results in the exemplary waveform 131. In a waveform of an exemplary waveform 132, the frequency bands of the subcarrier areas at both sides of the original main optical signal in the exemplary waveform 130 are narrowed, and the quality of the subcarrier areas at both sides is greatly deteriorated. Thus, the narrowing of a frequency band in PBN leads to a degradation of the transmission characteristics of a CW light, which results in a deterioration of a main optical signal.

As indicated by the exemplary waveform 122 of FIG. 1 and in the exemplary waveform 132 of FIG. 2, if a main optical signal passes through a plurality of ROADM nodes 110, the transmission characteristics of light are degraded. Thus, it is important to measure the transmission characteristics in advance and to know the deterioration of the quality of a main optical signal in advance. When transmission characteristics are measured, for example, the center frequency of a CW light is changed so as to measure an optical power for every frequency at a reception side. However, when the center frequency of a CW light is finely changed, there is a problem in which time for measuring an optical power increases at the reception side. On the other hand, if a transmission side makes the extent of change in the center frequency larger and the reception side obtains the transmission characteristics every time the center frequency is changed, the measurement time can be made shorter. However, in this case, there has been a problem in which the accuracy of the transmission characteristics is lower.

Thus, in the embodiment, a measurement device is realized that can easily measure the transmission characteristics of light in a transmission path so as to make a measurement time shorter.

Figure 3:
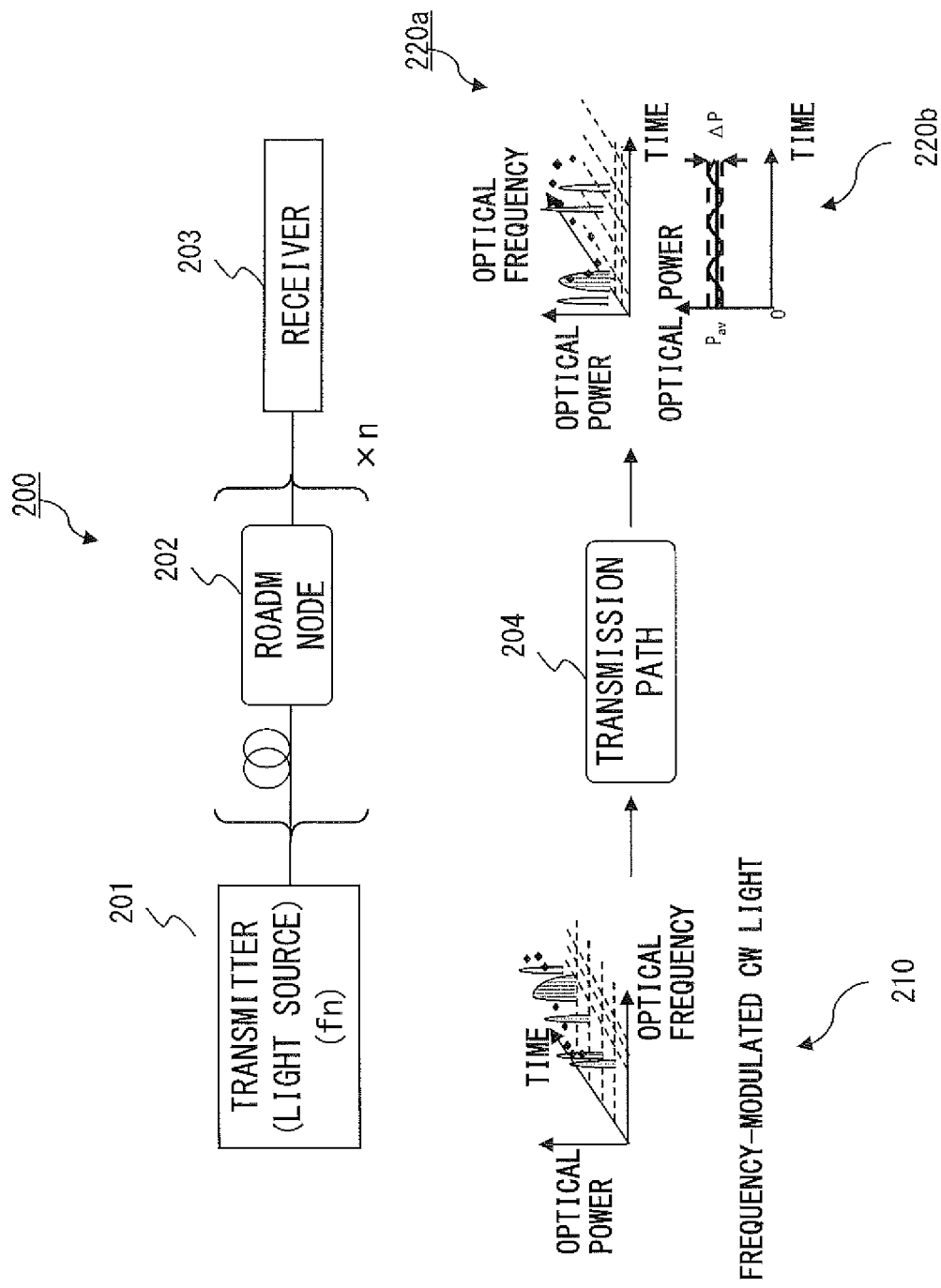
FIG. 3 illustrates an example of a method for measuring transmission characteristics according to an embodiment of the present invention.

FIG. 3 illustrates an example of a method for measuring transmission characteristics according to the embodiment. A measurement device 200 according to the embodiment includes a transmitter 201, a transmission path 204 that includes a plurality of ROADM nodes 202, and a receiver 203. The transmitter 201 includes a light source that emits a CW light and a modulator that modulates the CW light. The transmitter 201 modulates the CW light from the light source and transmits it to the transmission path 204 that includes the plurality of ROADM nodes 202. An exemplary waveform 210 represents an example of a frequency-modulated CW light. The exemplary waveform 210 is a diagram that represents a relationship between an optical frequency (x-axis), an optical power (y-axis), and a time (z-axis). The exemplary waveform 210 represents a CW light that has frequency variation in a range of a predetermined frequency ($\Delta f$) along with the time and in which the optical power is not changed from a predetermined value. It is sufficient if $\Delta f$ is a small value. The transmitter 201 corresponds to the transmitter (Tx) of a ROADM node.

The frequency-modulated CW light from the transmitter 201 is transmitted to the receiver 203 through the transmission path 204 that includes the plurality of ROADM nodes 202. The transmission path 204 is a transmission path that includes a plurality of ROADM nodes and whose transmission characteristics are to be measured.

The receiver 203 receives the CW light in which PBN occurred in the transmission path. The receiver 203 measures an optical power and a frequency of the received CW light in order to measure the transmission characteristics of the CW light in which PBN occurred. An exemplary waveform 220a represents an example of a frequency-modulated CW light that has been transmitted through the transmission path 204. The exemplary waveform 220a is a diagram that represents a relationship between a time (x-axis), an optical power (y-axis), and an optical frequency (z-axis). In the exemplary waveform 220a, a frequency component that varies in a range of a predetermined frequency ($\Delta f$) is associated with an optical power that has been lost through the transmission path 204. An exemplary waveform 220b is a diagram in which the component of the optical power (y-axis) is associated with the time (x-axis) on the basis of the exemplary waveform 220a. As seen from the diagram, the optical power is measured while varying along with the time. In the following description, the variation range of the optical power is referred to as "$\Delta P$", and the average value of the optical power is referred to as "$P_{AV}$". The receiver 203 corresponds to the receiver (Rx) of a ROADM node.

As described above, when a frequency-modulated CW light is transmitted from the transmitter 201, the receiver 203 measures an optical power of the CW light. After that, while changing the center frequency of the CW light to be transmitted, the transmitter 201 transmits the modulated CW light to the transmission path to be measured. The receiver 203 measures an optical power of the CW light every time the center frequency is changed. For example, the center frequency is changed as $f_1$, $f_2$, $f_3$, or $f_4$ in the transmitter 201. The receiver 203 calculates or predicts transmission characteristics by use of the optical power for each center frequency.

Figure 4:
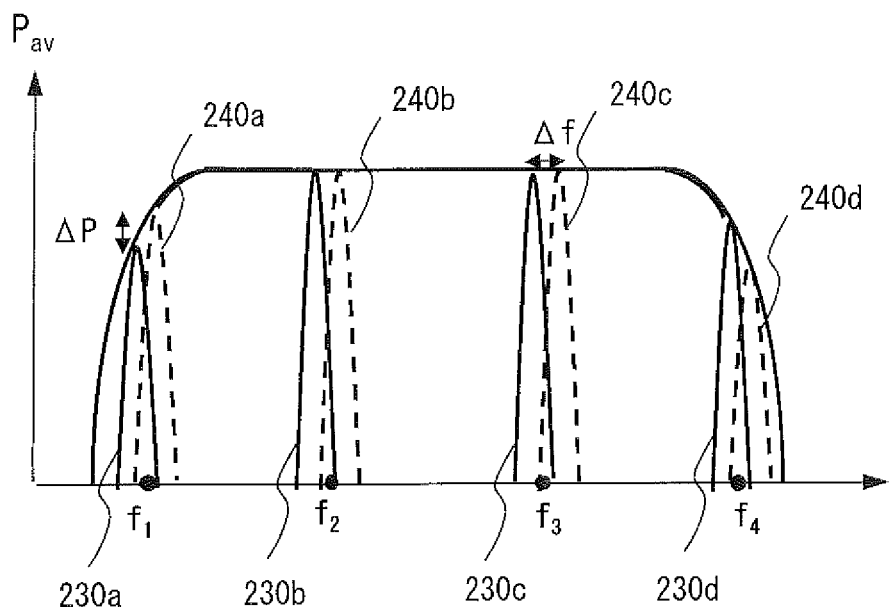
FIG. 4 illustrates an example of a method for calculating transmission characteristics according to the embodiment.

FIG. 4 illustrates an example of a method for calculating transmission characteristics according to the embodiment. For example, the transmitter 201 transmits a CW light obtained by modulating a CW light of a center frequency $f_1$ by an amount of frequency modulation $\Delta f$. The receiver 203 measures an optical power of the frequency-modulated CW light. The transmitter 201 transmits a CW light obtained by modulating a CW light of a center frequency $f_2$ by an amount of frequency modulation $\Delta f$. The receiver 203 measures an optical power of the frequency-modulated CW light. The transmitter 201 transmits a CW light obtained by modulating a CW light of a center frequency $f_3$ by an amount of frequency modulation $\Delta f$. The receiver 203 measures an optical power of the frequency-modulated CW light. The transmitter 201 transmits a CW light obtained by modulating a CW light of a center frequency $f_4$ by an amount of frequency modulation $\Delta f$. The receiver 203 measures an optical power of the frequency-modulated CW light.

When each the frequency-modulated CW lights of the center frequencies $f_1$ to $f_4$ passes through the transmission path, a power loss occurs, and has an amplitude component $\Delta P$ of an optical power as represented in the exemplary waveform 220b. In FIG. 4, the transmission characteristics of the optical power of the center frequency $f_1$ are described using examples of a wave 230a and a wave 240a. The difference between the maximum value of the optical power of the wave 230a and the maximum value of the optical power of the wave 240a is an amplitude component $\Delta P$ (y-axis) of the optical power of the center frequency $f_1$. The wave 230a and the wave 240a have frequencies different from each other by the amount of frequency modulation $\Delta f$.

The transmission characteristics of the optical power of the center frequency $f_2$ are described using examples of a wave 230b and a wave 240b. The difference between the maximum value of the optical power of the wave 230b and the maximum value of the optical power of the wave 240b is an amplitude component $\Delta P$ of the optical power of the center frequency $f_2$. Here, the amplitude component $\Delta P$ of the optical power of the center frequency $f_2$ is zero. The wave 230b and the wave 240b have frequencies different from each other by the amount of frequency modulation $\Delta f$.

The transmission characteristics of the optical power of the center frequency $f_3$ are described using examples of a wave 230c and a wave 240c. The difference between the maximum value of the optical power of the wave 230c and the maximum value of the optical power of the wave 240c is an amplitude component $\Delta P$ of the optical power of the center frequency $f_3$. Here, the amplitude component $\Delta P$ of the optical power of the center frequency $f_3$ is zero. The wave 230c and the wave 240c have frequencies different from each other by the amount of frequency modulation $\Delta f$.

The transmission characteristics of the optical power of the center frequency $f_4$ are described using examples of a wave 230d and a wave 240d. The difference between the maximum value of the optical power of the wave 230d and the maximum value of the optical power of the wave 240d is an amplitude component $\Delta P$ (y-axis) of the optical power of the center frequency $f_4$. The wave 230d and the wave 240d have frequencies different from each other by the amount of frequency modulation $\Delta f$.

The accuracy of the transmission characteristics obtained by using information on the optical powers of the CW lights of the center frequencies $f_1$, $f_2$, $f_3$, and $f_4$ is low because information on each optical power between two of the center frequencies is insufficient. Thus, the information on each optical power between two of the center frequencies needs to be interpolated.

The receiver according to the embodiment calculates an optical power between two of the center frequencies $f_1$, $f_2$, $f_3$, and $f_4$ so as to perform interpolation. For example, an optical power between the center frequency $f_1$ ($f_n$) and the center frequency $f_2$ ($f_{n+1}$) is calculated using Formula 1 to Formula 5 below.

$$P_{AV}(f) = af^3 + bf^2 + cf + d$$

$$S'(f) = \frac{\Delta P(f)}{\Delta f} = 3af^2 + 2bf + c$$

An average value $P_{av}$ of an optical power is obtained by performing measurement using a received CW light. In Formula 1, it is assumed that the average value $P_{av}$ of an optical power is a cubic function ($af^3+bf^2+cf+d$). a, b, c, and d in the cubic function are values that are unknown at this point. When the optical power between the center frequency $f_1$ ($f_n$) and the center frequency $f_2$ ($f_{n+1}$) is obtained, Formula 1 is generated corresponding to the center frequency $f_1$ and the center frequency $f_2$.

$\Delta P/\Delta f$ that indicates a slope of optical transmission characteristics is obtained by performing measurement using the received CW light. Here, $\Delta P/\Delta f$ that indicates a slope of optical transmission characteristics can also be a value $S'(f)$ obtained by differentiating transmission characteristics $S(f)$. In Formula 2, it is assumed that the slope of optical transmission characteristics is a quadratic function ($3af^2+2bf+c$). a, b, and c in the quadratic function are values that are unknown at this point. When the optical power between the center frequency $f_1$ ($f_n$) and the center frequency $f_2$ ($f_{n+1}$) is obtained, Formula 2 is generated corresponding to the center frequency $f_1$ and the center frequency $f_2$.

The values a, b, c, and d can be calculated by combining Formula 1 and Formula 2. When Formula 1 and Formula 2 are combined, an equation having a matrix represented by Formula 3 below for example will result.

$$\begin{bmatrix} a_n \\ b_n \\ c_n \\ d_n \end{bmatrix} = \begin{bmatrix} f_n^3 & f_n^2 & f_n & 1 \\ f_{n+1}^3 & f_{n+1}^2 & f_{n+1} & 1 \\ 3f_n^2 & 2f_n & 1 & 0 \\ f_{n+1}^2 & 2f_{n+1} & 1 & 0 \end{bmatrix}^{-1} \begin{bmatrix} P_{AVn} \\ P_{AVn+1} \\ S'_n \\ S'_{n+1} \end{bmatrix}$$

When the values a, b, c, and d are calculated, the optical power between the center frequency $f_1$ ($f_n$) and the center frequency $f_2$ ($f_{n+1}$) can be represented by Formula 4 below. The transmission characteristics between the center frequency $f_1$ ($f_n$) and the center frequency $f_2$ ($f_{n+1}$) can be interpolated by substituting each frequency between the center frequency $f_1$ ($f_n$) and the center frequency $f_2$ ($f_{n+1}$) in Formula 4.

$$P_{AV}(f) = a_n f^3 - b_n f^2 + a_n f + d_n (f_n < f < f_{n+1})$$

As a result, the transmission characteristics of a normalized transmission path according to the embodiment can also be represented by Formula 5.

$$S(f) = P_{AV}(f) / \max(P_{AV})$$

As described above, the transmission characteristics between the two points, the center frequency $f_1$ ($f_n$) and the center frequency $f_2$ ($f_{n+1}$), can be calculated from an amplitude component $\Delta P$ of an optical power between the center frequency $f_1$ ($f_n$) and the center frequency $f_2$ ($f_{n+1}$) for a width of frequency modulation $\Delta f$ and an average value of the optical power. Thus, a measurement of an optical power in a frequency band between the two points can be omitted. As a result, if the method for calculating transmission characteristics according to the embodiment is used, it is possible to reduce the number of measurements and to obtain optical transmission characteristics with a high degree of accuracy in less time. If similar processing is repeatedly performed between two points such as between the center frequency $f_2$ and the center frequency $f_3$, and between the center frequency $f_3$ and the center frequency $f_4$, a result of the transmission characteristics as illustrated in FIG. 4 can be obtained.

In the method for calculating transmission characteristics using Formula 1 to Formula 5 above, the transmission characteristics between two points that are center frequencies are calculated. However, the method for calculating transmission characteristics using Formula 1 to Formula 5 does not limit the number of center frequencies used to calculate transmission characteristics. For example, transmission characteristics between three points that are center frequencies may be calculated using the three points. For example, an optical power between the three points, the center frequency $f_1$ ($f_n$), the center frequency $f_2$ ($f_{n+1}$) and the center frequency $f_3$ ($f_{n+2}$), can be calculated using Formula 6 to Formula 10 below.

$$P_{AV}(f) = af^5 + bf^4 + cf^3 + df^2 + ef + g$$

$$S'(f) = \frac{\Delta P(f)}{\Delta f} = 5af^4 + 4bf^3 + 3cf^2 + 2df + e$$

An average value $P_{av}$ of an optical power is obtained by performing measurement using a received CW light. In Formula 6, it is assumed that the average value $P_{av}$ of an optical power is a quintic function ($af^5+bf^4+cf^3+df^2+ef+g$). a, b, c, d, e, and g in the quintic function are values that are unknown at this point. When the optical power between the three points, the center frequency $f_1$ ($f_n$), the center frequency $f_2$ ($f_{n+1}$), and the center frequency $f_3$ ($f_{n+2}$), is obtained, Formula 6 is generated corresponding to the center frequency $f_1$ ($f_n$), the center frequency $f_2$ ($f_{n+1}$), and the center frequency $f_3$ ($f_{n+2}$).

$\Delta P/\Delta f$ that indicates a slope of an optical power is obtained by performing measurement using the received CW light. $\Delta P/\Delta f$ that indicates a slope of an optical power can also be a value obtained by differentiating transmission characteristics S (f). In Formula 7, it is assumed that the slope of an optical power is a quartic function ($5af^4+4bf^3+3cf^2+2df+e$). a, b, c, d, and e in the quartic function are values that are unknown at this point. When the optical power between the three points, the center frequency $f_1$ ($f_n$), the center frequency $f_2$ ($f_{n+1}$), and the center frequency $f_3$ ($f_{n+2}$), is obtained, Formula 7 is generated corresponding to the center frequency $f_1$ ($f_n$), the center frequency $f_2$ ($f_{n+1}$), and the center frequency $f_3$ ($f_{n+2}$).

The values a, b, c, d, e, and g can be calculated by combining Formula 6 and Formula 7. When Formula 6 and Formula 7 are combined, an equation having a matrix represented by Formula 8 below for example will result.

$$\begin{bmatrix} a_n \\ b_n \\ c_n \\ d_n \\ e_n \\ g_n \end{bmatrix} = \begin{bmatrix} f_n^5 & f_n^4 & f_n^3 & f_n^2 & f_n & 1 \\ f_{n+1}^5 & f_{n+1}^4 & f_{n+1}^3 & f_{n+1}^2 & f_{n+1} & 1 \\ f_{n+2}^5 & f_{n+2}^4 & f_{n+2}^3 & f_{n+2}^2 & f_{n+2} & 1 \\ 5f_n^4 & 4f_n^3 & 3f_n^2 & 2f_n & 1 & 0 \\ 5f_{n+1}^4 & 4f_{n+1}^3 & 3f_{n+1}^2 & 2f_{n+1} & 1 & 0 \\ 5f_{n+2}^4 & 4f_{n+2}^3 & 3f_{n+2}^2 & 2f_{n+2} & 1 & 0 \end{bmatrix}^{-1} \begin{bmatrix} P_{AVn} \\ P_{AVn+1} \\ P_{AVn+2} \\ S'_n \\ S'_{n+1} \\ S'_{n+2} \end{bmatrix}$$

When the values a, b, c, d, e, and g are calculated, the optical power between the center frequency $f_1$ ($f_n$), the center frequency $f_2$ ($f_{n+1}$), and the center frequency $f_3$ ($f_{n+2}$) can be represented by Formula 9 below. The transmission characteristics between the center frequency $f_1$ ($f_n$), the center frequency $f_2$ ($f_{n+1}$) (r and the center frequency $f_3$ ($f_{n+2}$) can be interpolated by substituting each frequency between two of the center frequency $f_1$ ($f_n$), the center frequency $f_2$ ($f_{n+1}$), and the center frequency $f_3$ ($f_{n+2}$) in Formula 9.

$$P_{AV}(f)=a_nf^5+b_nf^4+a_nf^3+d_nf^2+a_nf+a_n(f_n \leq f \leq f_{n+1})$$

As a result, the transmission characteristics of a normalized transmission path according to the embodiment can be represented by Formula 10.

$$S(f)=P_{AV}(f)/\max(P_{AV})$$

As described above, the transmission characteristics between the three points, the center frequencies $f_1$ ($f_n$) to $f_3$ ($f_{n+2}$), can be calculated from an amplitude component $\Delta P$ of an optical power between the center frequencies $f_1$ ($f_n$) to $f_3$ ($f_{n+2}$) for a width of frequency modulation $\Delta f$ and an average value of the optical power. Thus, a measurement of an optical power in a frequency band between the three points can be omitted. As a result, if the method for calculating transmission characteristics according to the embodiment is used, it is possible to reduce the number of measurements and to obtain optical transmission characteristics with a high degree of accuracy in less time. If similar processing is repeatedly performed between three points such as between the center frequency $f_2$, the center frequency $f_3$, and the center frequency $f_4$, a result of the transmission characteristics as illustrated in FIG. 4 can be obtained.

Figure 5:
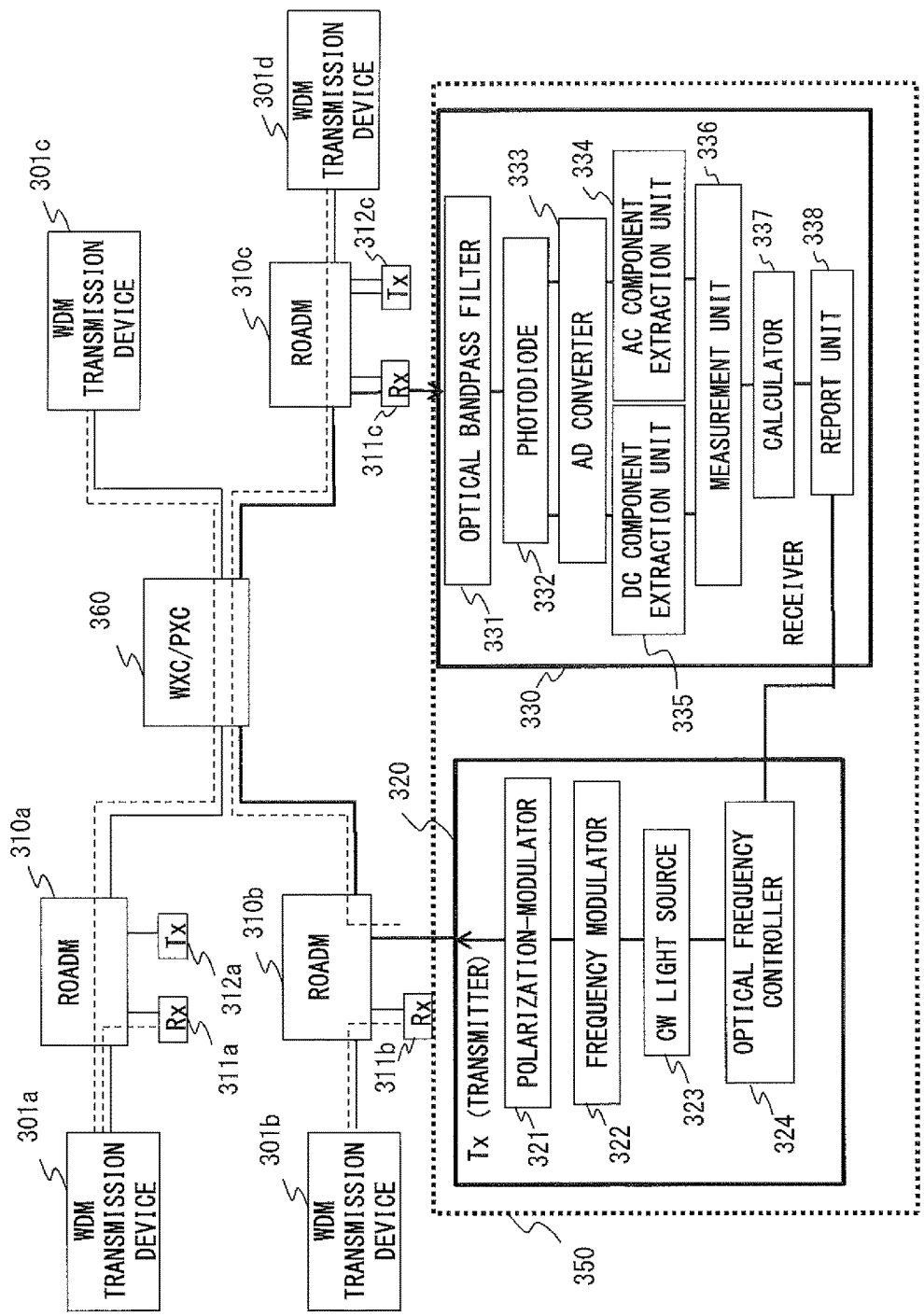
FIG. 5 illustrates an example of a configuration of a measurement device according to the embodiment.

FIG. 5 illustrates an example of a configuration of the measurement device according to the embodiment. In a ROADM system, a WDM transmission device 301 transmits an optical signal so as to transfer the optical signal to a device or a node through a ROADM node 310. An optical signal from a WDM transmission device 301a is dropped by, for example, a receiver (Rx) 311a of a ROADM node 310a. Further, the optical signal transmitted from the WDM transmission device 301a may be transmitted to a WXC (wavelength cross connect)/PXC (photonic cross connect) 360. The WXC/PXC 360 is a technology that performs cross-connection for each wavelength using a WSS, and for example, an optical path is set in a WDM network according to the traffic change. Accordingly, the WXC/PXC 360 can transmit an optical signal received from a certain WDM transmission device 301 to a ROADM node 310 other than that of the certain WDM transmission device 301.

A measurement device 350 according to the embodiment includes a transmitter 320 and a receiver 330. In the example of FIG. 5, the measurement device 350 calculates the transmission characteristics of a CW light that has passed through a ROADM node 310b, the WPC/PXC 360, and a ROADM node 310c. The route up to the receiver 330 through the ROADM node 310b, the WPC/PXC 360 and the ROADM node 310c through which the CW light output from the transmitter 320 passes is hereinafter referred to as a transmission path to be measured.

A transmitter (Tx) of the ROADM node 310b in the transmission path to be measured is used as the transmitter 320 of the measurement device 350 according to the embodiment. An optical frequency controller 324 in the transmitter 320 controls a frequency of light output from a CW light source 323. The CW light source 323 outputs a CW light of a frequency designated by the optical frequency controller 324. A frequency modulator 322 frequency-modulates the CW light output from the CW light source 323. After that, a polarization-modulator 321 polarization-modulates the CW light.

The frequency-modulated CW light is transmitted from the transmitter 320 to the receiver 330 through the transmission path to be measured. The CW light transmitted through the WXC/PXC 360 is dropped by a WSS function of the ROADM 310c and transmitted to the receiver 330. In the receiver 330, an optical bandpass filter 331 transmits light of a specific wavelength range in the received CW light. A photodiode 332 detects an optical power of the CW light that is transmitted through the optical bandpass filter 331. An AD (analog/digital) converter 333 converts, from an analog signal to a digital signal, an electrical signal that is an optical signal and that indicates the optical power of the CW light. The optical signal that has been replaced with a digital signal by the AD converter 333 is separated by an AC component extraction unit 334 and a DC component extraction unit 335 into their respective components. The AC component extraction unit 334 extracts an AC component from the CW light. The extracted AC component is an amplitude component ΔP (or a slope ΔP/Δf) of an optical power. The DC component extraction unit 335 extracts a DC component from the CW light. The extracted DC component is an average value of an optical power. A measurement unit 336 measures the average value of an optical power and the amplitude component ΔP of an optical power that are extracted by the AC component extraction unit 334 and the DC component extraction unit 335, and a frequency component. A calculator 337 calculates transmission characteristics using the optical power and the frequency that are measured by the measurement unit 336, and formulas such as Formula 1 to Formula 10 of FIG. 4. A report unit 338 reports, for example, a result that is the transmission characteristics to the transmitter 320.

If the measurement device that uses the method for calculating transmission characteristics according to the embodiment is used, it is possible to reduce the number of measurements and to measure optical transmission characteristics with a high degree of accuracy in less time. Further, if the transmission characteristics of a transmission path are measured, it is possible to know, for example, an optimal frequency position and an optimal main signal spectrum shape to perform the setting, in order not to affect the quality of a signal. Furthermore, if the method for transmission characteristics of light according to the embodiment is performed, it is possible to simply realize a measurement of the transmission characteristics of a transmission path at a low cost.

Figure 6:
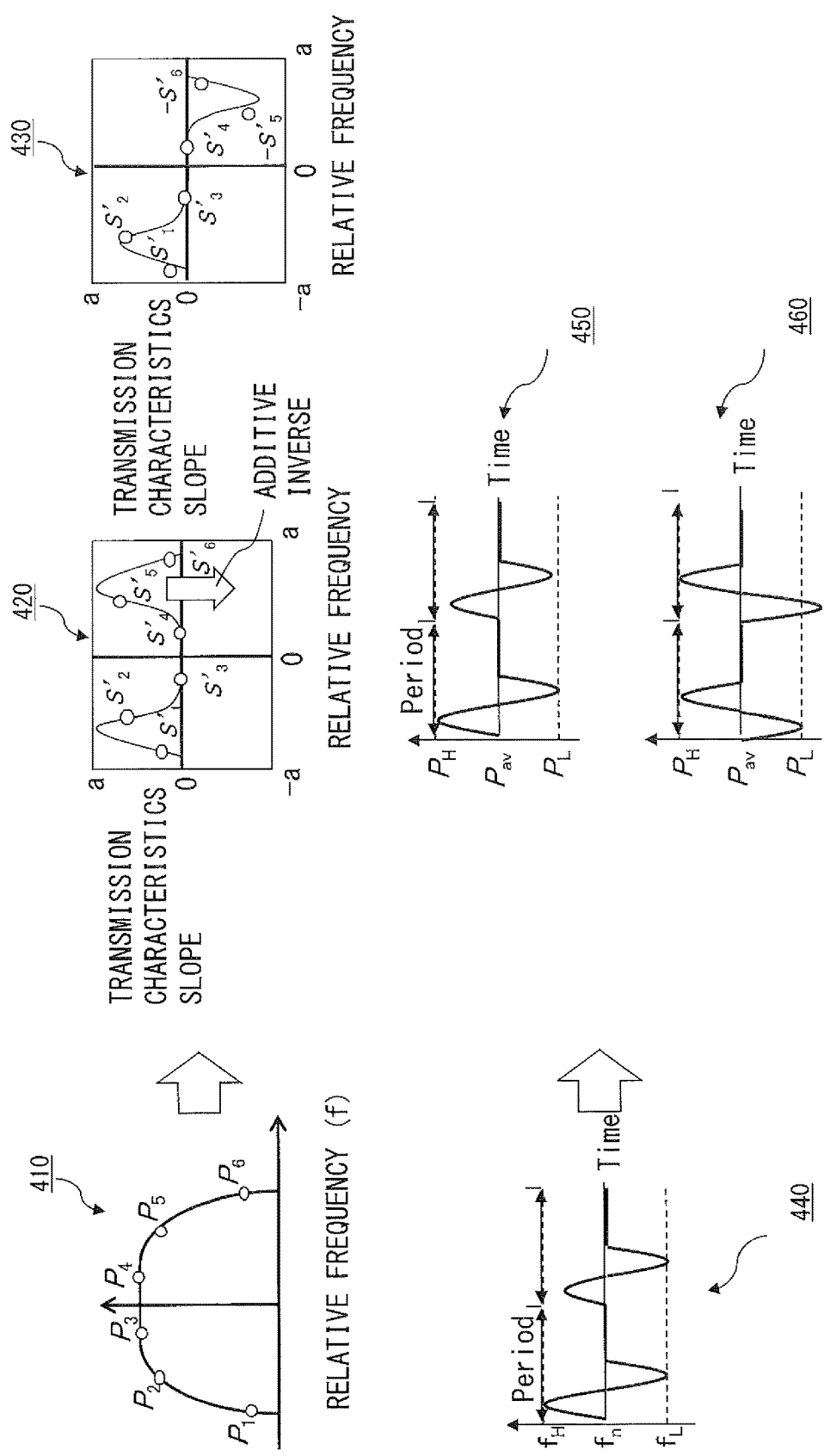
FIG. 6 is a diagram (Part 1) for explaining an example of processing performed by a measurement unit and a calculator.

FIG. 6 is a diagram (Part 1) for explaining an example of processing performed by the measurement unit and the calculator. In the example of FIG. 6, optical powers of six center frequencies $P_1$ to $P_6$ are measured so as to obtain transmission characteristics according to a relative frequency, as represented in exemplary transmission characteristics 410. An example of $S'_1$ ($\Delta P_1/\Delta f$) to $S'_6$ ($\Delta P_6/\Delta f$) that can actually be obtained by the photodiode 332 is represented in an exemplary transmission characteristics slope 420.

When the measurement unit 336 measures an optical power of a CW light that is actually detected by the photodiode 332, ΔP that is an amplitude component of the optical power is a positive number. Likewise, ΔP/Δf that indicates a slope of transmission characteristics is a positive number. Thus, as represented in the exemplary transmission characteristics slope 420, at all relative frequencies, $S'_1$ ($\Delta P_1/\Delta f$) to $S'_6$ ($\Delta P_6/\Delta f$) are positive numbers. In the exemplary transmission characteristics slope 420, a vertical axis represents a magnitude of a transmission characteristics slope, and a horizontal axis represents a frequency f. Then, the calculator 337 is not able to determine whether the slope of $P_5$ and $P_6$ indicates a decrease or an increase, with the result that a calculation of correct transmission characteristics using Formula 2 and Formula 7 is not performed.

Thus, the measurement device according to the embodiment permits a modulation of a CW light with an FM (frequency modulation) modulation waveform in order to calculate correct transmission characteristics. It is assumed that the CW light source 323 includes a function that FM-modulates a CW light which the CW light source 323 itself outputs. The FM modulation waveform is a wave as represented in an exemplary FM modulation waveform 440, and has a frequency width of $f_H$ to $f_L$. In this case, the frequency differential between $f_H$ and $f_L$ is Δf.

The CW light source 323 of the transmitter 320 outputs a CW light on which a wave in the exemplary FM modulation waveform 440 is superimposed. The frequency modulator 322 frequency-modulates the CW light (controls a center frequency). After that, the CW light is transmitted to the receiver 330 through the transmission path. Then, the AD converter 333 of the receiver 330 obtains an exemplary FM modulation waveform 450 or an exemplary FM modulation waveform 460 from the CW light. The exemplary FM modulation waveform 450 is an example in which the waveform is not changed after the wave in the exemplary FM modulation waveform 440 is transmitted through the transmission path. On the other hand, in the exemplary FM modulation waveform 460, as a result of transmitting the wave through the transmission path, the wave that has the frequency $f_H$ to $f_L$ in the exemplary FM modulation waveform 440 is inverted. The exemplary FM modulation waveform 450 represents a waveform that is obtained in the case of $S'_1$ ($\Delta P_1/\Delta f$) to $S'_3$ ($\Delta P_3/\Delta f$). Thus, in the case of the exemplary FM modulation waveform 450, the calculator 337 determines that ΔP is a positive number and calculates transmission characteristics. As a result of the calculation performed by the calculator 337, $S'_1$ to $S'_3$ in an exemplary transmission characteristics slope 430 is obtained as the transmission characteristics, as is the case with $S'_1$ to $S'_3$ in the exemplary transmission characteristics slope 420.

On the other hand, the exemplary FM modulation waveform 460 represents a waveform that is obtained in the case of $S'_4$ ($\Delta P_4/\Delta f$) to $S'_6$ ($\Delta P_6/\Delta f$). In the case of the exemplary FM modulation waveform 460, the calculator 337 determines that ΔP is a negative number and calculates transmission characteristics. As a result of the calculation performed by the calculator 337, additive-inverse processing is performed on the values of $S'_4$ to $S'_6$ in the exemplary transmission characteristics slope 420, and $S'_4$ to $S'_6$ in the exemplary transmission characteristics slope 430 is obtained as the transmission characteristics.

As described above, although it detects a CW light whose optical power has a value of a positive number, the photodiode 332 modulates the CW light using an FM modulation waveform and determines whether an FM modulation waveform received by the receiver is inverted, so as to determine whether ΔP is positive or negative.

In another embodiment, a portion on which additive-inverse processing is performed may be specified. For example, with respect to $P_1$ to $P_6$, two optical powers adjacent to each other are compared. When optical powers of adjacent portions such as $P_1$ and $P_2$ are compared, the value of an optical power increases from $P_1$ to $P_2$. In such a case, with respect to $S'_1$ to $S'_2$, the calculator 337 determines that ΔP is a positive number so as to calculate transmission characteristics. On the other hand, when optical powers of adjacent portions such as $P_5$ and $P_6$ are compared, the value of an optical power decreases from $P_5$ to $P_6$. In such a case, with respect to $S'_5$ and $S'_6$, the calculator 337 determines that ΔP is a negative number and performs additive-inverse processing on the values of $S'_5$ and $S'_6$, so as to calculate transmission characteristics.

Figure 7:
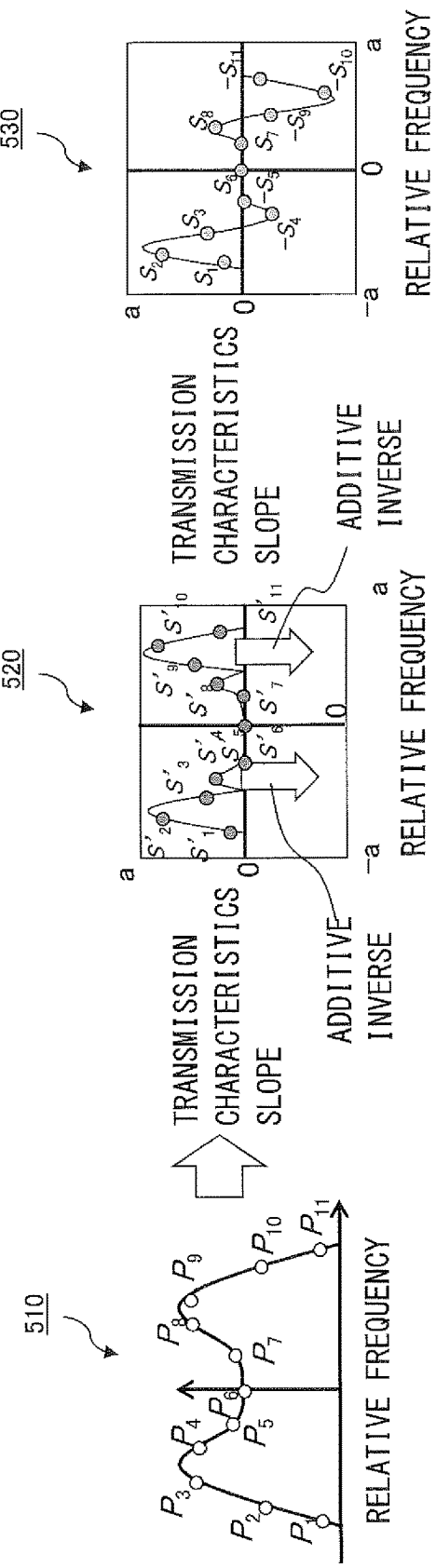
FIG. 7 is a diagram (Part 2) for explaining an example of the processing performed by the measurement unit and the calculator.

FIG. 7 is a diagram (Part 2) for explaining an example of the processing performed by the measurement unit and the calculator. In the example of FIG. 7, optical powers of eleven center frequencies $P_1$ to $P_{11}$ are measured so as to obtain transmission characteristics according to a relative frequency, as represented in exemplary transmission characteristics 510. The optical power increases and decreases repeatedly in the exemplary transmission characteristics 510, which is different from the case of the exemplary transmission characteristics 410. Correspondingly to the exemplary transmission characteristics 510, an example of $S'_1$ ($\Delta P_1/\Delta f$) to $S'_{11}$ ($\Delta P_{11}/\Delta f$) that can actually be obtained by the photodiode 332 is represented in an exemplary transmission characteristics slope 520.

When the measurement unit 336 measures an optical power of a CW light that is actually detected by the photodiode 332, $\Delta P$ that is an amplitude component of the optical power is a positive number. Likewise, $\Delta P/\Delta f$ that indicates a slope of transmission characteristics is a positive number. Thus, as represented in the exemplary transmission characteristics slope 520, at all relative frequencies, $S'_1$ ($\Delta P_1/\Delta f$) to $S'_{11}$ ($\Delta P_{11}/\Delta f$) are positive numbers. Then, the calculator 337 is not able to determine whether the slope of $P_4$ and $P_5$ and the slope of $P_9$, $P_{10}$, and $P_{11}$ indicate a decrease or an increase, with the result that a calculation of correct transmission characteristics using Formula 2 and Formula 7 is not performed.

Thus, the measurement device according to the embodiment permits a modulation of a CW light with an FM modulation waveform in order to calculate correct transmission characteristics. The FM modulation waveform is a wave as represented in the exemplary FM modulation waveform 440, and has a frequency width of $f_H$ to $f_L$. In this case, the frequency differential between $f_H$ and $f_L$ is $\Delta f$.

The CW light source 323 of the transmitter 320 outputs a CW light on which a wave in the exemplary FM modulation waveform 440 is superimposed. The frequency modulator 322 frequency-modulates the CW light (controls a center frequency). After that, the CW light is transmitted to the receiver 330 through the transmission path. Then, the AD converter 333 of the receiver 330 obtains the exemplary FM modulation waveform 450 or the exemplary FM modulation waveform 460 from the CW light. The exemplary FM modulation waveform 450 represents a waveform that is obtained in the cases of $S'_1$ ($\Delta P_1/\Delta f$) to $S'_3$ ($\Delta P_3/\Delta f$) and $S'_6$ ($\Delta P_6/\Delta f$) to $S'_8$ ($\Delta P_8/\Delta f$). Thus, in the case of the exemplary FM modulation waveform 450, the calculator 337 determines that $\Delta P$ is a positive number and calculates transmission characteristics. As a result of the calculation performed by the calculator 337, $S'_1$ to $S'_3$ and $S'_6$ to $S'_8$ in an exemplary transmission characteristics slope 530 are obtained as the transmission characteristics, as is the case with $S'_1$ to $S'_3$ and $S'_6$ to $S'_8$ in the exemplary transmission characteristics slope 520.

On the other hand, the exemplary FM modulation waveform 460 represents a waveform that is obtained in the cases of $S'_4$ ($\Delta P_4/\Delta f$) to $S'_5$ ($\Delta P_5/\Delta f$) and $S'_9$ ($\Delta P_9/\Delta f$) to $S'_{11}$ ($\Delta P_{11}/\Delta f$). In the case of the exemplary FM modulation waveform 460, the calculator 337 determines that $\Delta P$ is a negative number and calculates transmission characteristics. As a result of the calculation performed by the calculator 337, additive-inverse processing is performed on the values of $S'_4$ to $S'_5$ and $S'_9$ to $S'_{11}$ in the exemplary transmission characteristics slope 520, and $S'_4$ to $S'_5$ and $S'_9$ to $S'_{11}$ in the exemplary transmission characteristics slope 530 are obtained as the transmission characteristics.

As described above, although it detects a CW light whose optical power has a value of a positive number, the photodiode 332 modulates the CW light using an FM modulation waveform and determines whether an FM modulation waveform received by the receiver is inverted, so as to determine whether $\Delta P$ is positive or negative.

Figure 8:
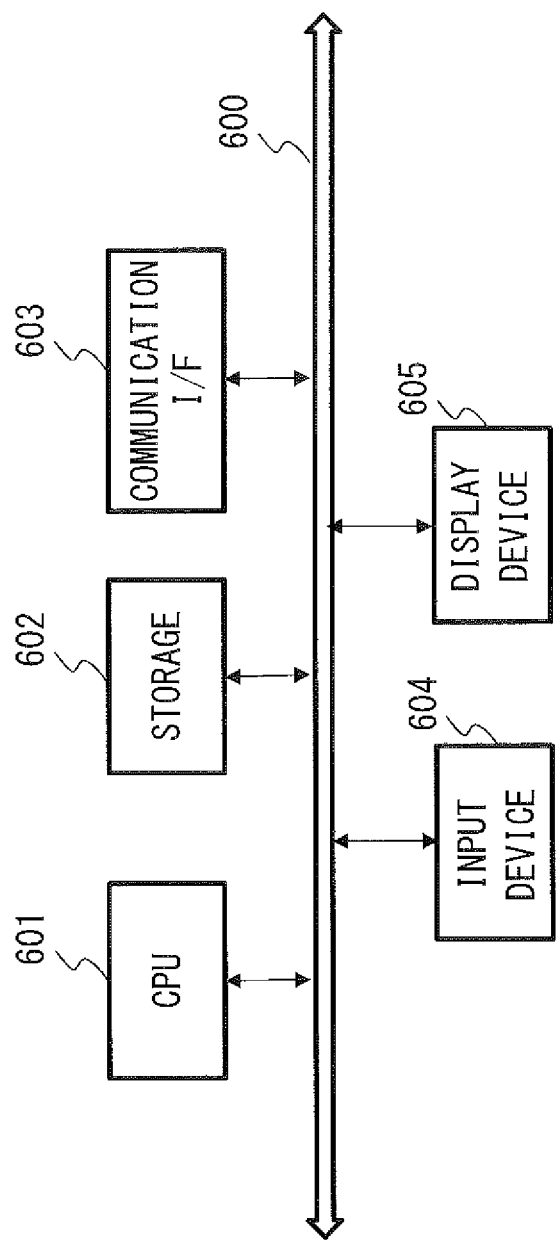
FIG. 8 illustrates an example of a hardware configuration of a transmitter and a receiver.

FIG. 8 illustrates an example of a hardware configuration of the transmitter and the receiver. The transmitter 320 and the receiver 330 have the same hardware configuration. The transmitter 320 and the receiver 330 each include a CPU (central processing unit) 601, a storage 602, a communication interface (I/F) 603, an input device 604, and a display device 605. The components are connected to one another through a bus 600.

In the transmitter 320, the CPU 601 can operate as the optical frequency controller 324. In the receiver 330, the CPU 601 can operate as the AD converter 333, the DC component extraction unit 335, the AC component extraction unit 334, the measurement unit 336, and the calculator 337. The CPU 601 can execute a program stored in the storage 602. The storage 602 also properly stores therein data obtained by the operation of the CPU 601 and data used for processing performed by the CPU 601. The communication I/F 603 is used for a communication between the transmitter 320 and the receiver 330.

A user manipulation permits the input device 604 to input data. The display device 605 is a display that displays various pieces of data.

Figure 9:
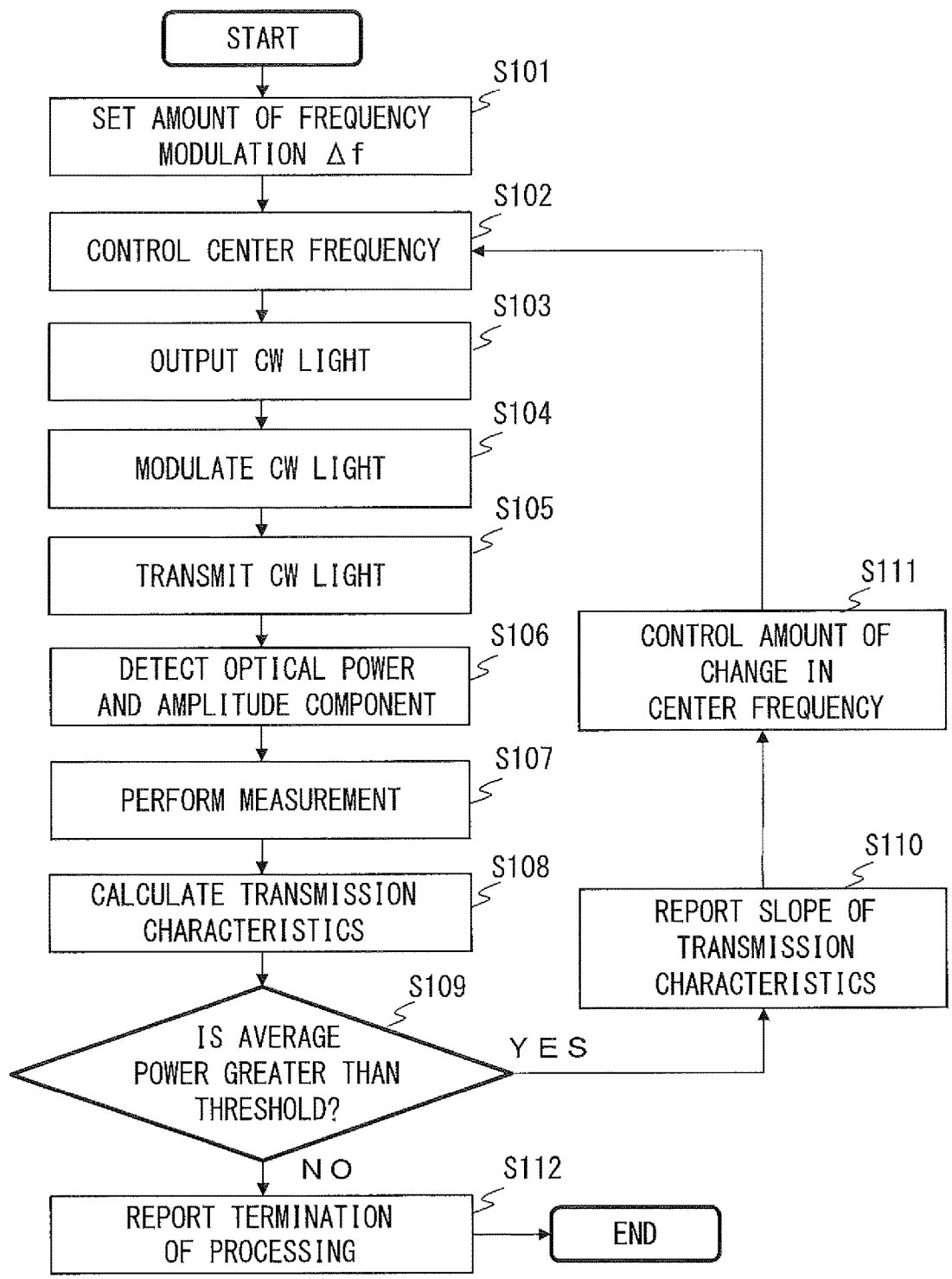
FIG. 9 is a flowchart that illustrates an example of processing performed by the transmitter and the receiver according to the embodiment.

FIG. 9 is a flowchart that illustrates an example of processing performed by the transmitter and the receiver according to the embodiment. An amount of frequency modulation $\Delta f$ is set in the frequency modulator 322 (Step S101). The optical frequency controller 324 controls a center frequency of a CW light output from the CW light source 323 (Step S102). The CW light source 323 outputs the CW light (Step S103). The frequency modulator 322 and the polarization-modulator 321 perform modulation processing and polarization processing, respectively (Step S104). The CW light modulated in the transmitter 320 is transmitted to the transmission path (Step S105).

The photodiode 332 of the receiver 330 detects a transmission optical power and an amplitude component $\Delta P$ (Step S106). On the basis of the transmission optical power detected by the photodiode 332, the measurement unit 336 measures, for example, a frequency component, an average value of the optical power, and the amplitude component $\Delta P$ (Step S107). The calculator 337 calculates transmission characteristics (Step S108). The calculator 337 determines whether an average power is greater than a predetermined threshold (Step S109).

When the average power is greater than the predetermined threshold (YES in Step S109), the report unit 338 reports a slope of transmission characteristics ($\Delta P/\Delta f$) to the optical frequency controller 324 (Step S110). On the basis of the slope of transmission characteristics ($\Delta P/\Delta f$), the optical frequency controller 324 controls the amount of frequency change from the center frequency used in Step S102 (Step S111). When the process of Step S111 is terminated, the transmitter 320 repeats the processes from Step S102.

When the average power is less than the predetermined threshold (NO in Step S109), the report unit 338 reports to the optical frequency controller 324 that the measurement processing will be terminated (Step S112). When the process of Step S112 is terminated, the transmitter 320 and the receiver 330 terminate the processing.

As described above, if transmission characteristics are calculated using a slope ($\Delta P/\Delta f$) of an optical power of a plurality of center frequencies, and an average value of the optical power, a measurement of an optical power in a frequency band can be omitted. As a result, if the method for calculating transmission characteristics according to the embodiment is used, it is possible to reduce the number of measurements and to obtain optical transmission characteristics with a high degree of accuracy in less time.

FIG. 10 is a diagram for explaining an example of processing performed by the optical frequency controller. Exemplary transmission characteristics 610 represent an example in which an optical power is measured while changing the center frequency at a predetermined interval. In the exemplary transmission characteristics 610, a vertical axis represents a transmission optical power, and a horizontal axis represents a relative frequency. In the exemplary transmission characteristics 610 in which an optical power is measured while changing the center frequency at a predetermined interval, an unnecessary measurement is performed in a central portion in which the optical power is not changed.

Exemplary transmission characteristics 620 represent an example in which an optical power is measured for portions (both ends) each having a slope of transmission characteristics (ΔP/Δf), and the number of measurements of an optical power is reduced for a central portion not having a slope of transmission characteristics (ΔP/Δf). In order to realize the example in the exemplary transmission characteristics 620, the report unit 338 of the receiver 330 reports information on a slope of transmission characteristics (ΔP/Δf) to the optical frequency controller 324 of the transmitter 320. On the basis of the value of a slope of transmission characteristics (ΔP/Δf), the optical frequency controller 324 controls the amount of frequency change in a center frequency. When the value of a slope of transmission characteristics (ΔP/Δf) is large, the optical frequency controller 324 makes the amount of change in the center frequency small. On the other hand, when the value of a slope of transmission characteristics (ΔP/Δf) is small, the optical frequency controller 324 makes the amount of change in the center frequency large.

In the embodiment, as represented in the exemplary transmission characteristics 610, an optical power is measured at a predetermined center frequency interval so as to calculate transmission characteristics. Then, if the transmission characteristics between center frequencies are calculated by use of, for example, Formula 1 to Formula 10, the measurement device can reduce the number of measurements and obtain optical transmission characteristics with a high degree of accuracy in less time.

Further, in the embodiment, an optical power may be measured while changing the amount of change in the center frequency on the basis of a slope of transmission characteristics, as represented in the exemplary transmission characteristics 620. Then, if the transmission characteristics between center frequencies are calculated by use of Formula 1 to Formula 10, the measurement device can reduce the number of measurements further and obtain optical transmission characteristics with a higher degree of accuracy in much less time, compared with the case of the exemplary transmission characteristics 610.

<Measurement Device According to Another Embodiment>

In the measurement device described in FIGS. 1 to 10, the receiver 330 is realized by, for example, an optical channel monitor (OCM). The measurement accuracy of the OCM has a difference of plus or minus a few gigahertz in frequency, or a difference of plus or minus a few decibels in optical power. As described above, the measurement accuracy at the frequency of the OCM is low.

Thus, in another embodiment, a PBN monitor is used for the receiver 330. When an optical channel monitor is used, the frequency of a CW light can be measured at a receiver side. The PBN monitor is not able to measure the frequency of a CW light.

Figure 11:
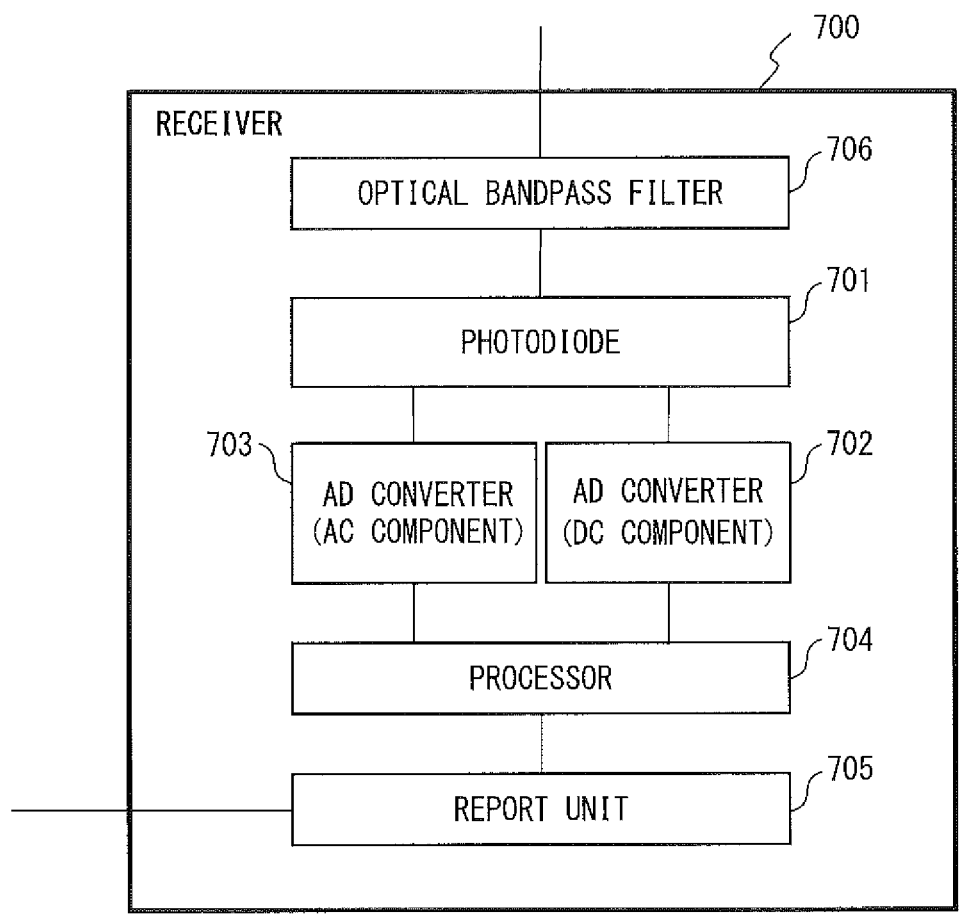
FIG. 11 illustrates an example of a configuration of a PBN monitor according to another embodiment.

FIG. 11 illustrates an example of a configuration of the PBN monitor according to another embodiment. In another embodiment, a receiver 700 is the PNB monitor. It is sufficient if, on behalf of the receiver 330 of FIG. 5, the receiver 700 is connected to the ROADM node 310c.

The receiver 700 includes an optical bandpass filter 706, a photodiode 701, an AD converter 702, an AD converter 703, a processor 704, and a report unit 705. The optical bandpass filter 706 transmits light of a specific wavelength range in a received CW light. The photodiode 701 detects an optical power of a CW light transmitted from the transmitter 320. The AD converter 702 converts an analog signal into a digital signal and extracts a DC component of the CW light. The AD converter 703 converts an analog signal into a digital signal and extracts an AC component of the CW light. The processor 704 measures results of the conversions performed in the AD converter 702 and the AD converter 703, and calculates transmission characteristics. The report unit 705 reports a slope of the transmission characteristics to the transmitter 320.

Figure 12:
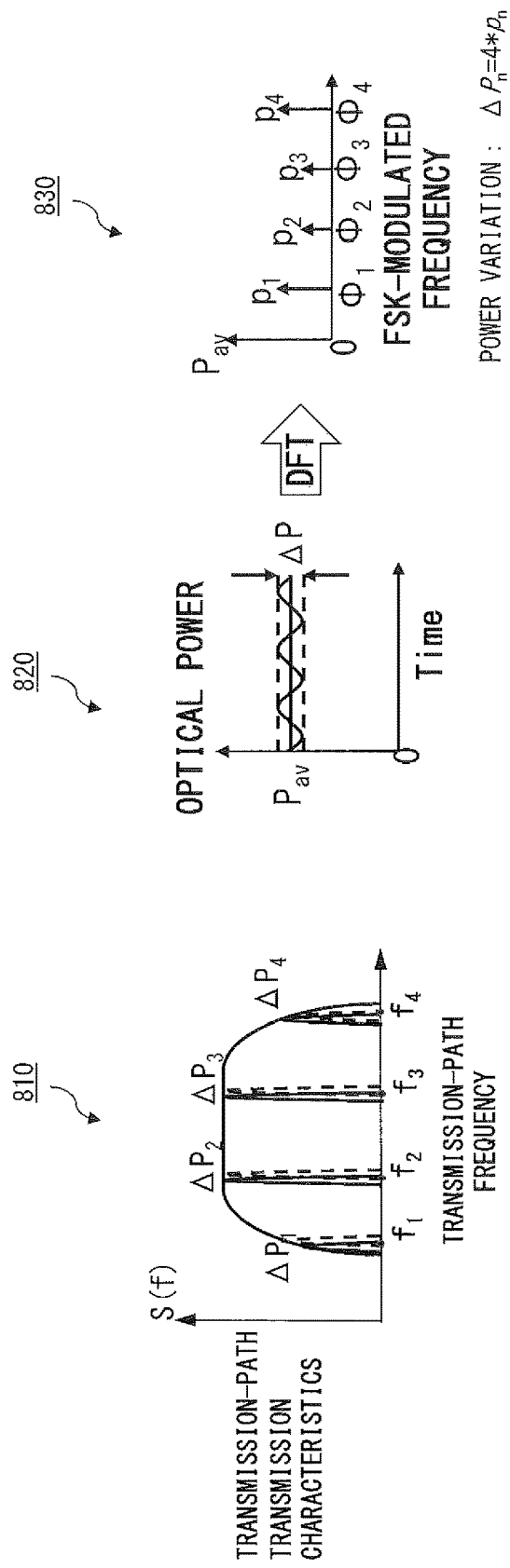
FIG. 12 is a diagram for explaining an example of processing performed by the measurement device using an FSK-modulated frequency.

FIG. 12 is a diagram for explaining an example of processing performed by the measurement device using an FSK-modulated frequency. In another embodiment, an FSK (frequency shift keying)-modulated-frequency modulated CW light is output in the CW light source 323 of the transmitter 320.

Exemplary CW-light transmission characteristics 810 represent an example of the transmission characteristics of a CW light received by the receiver 700. This is similar to the example of the transmission characteristics in FIG. 4. An exemplary CW-light power 820 is similar to the exemplary waveform 220b. However, the CW light according to another embodiment is modulated with an FSK-modulated frequency.

The FSK-modulated frequency is included in an AC component of a CW light, and the AD converter 703 extracts the AC component from the CW light. The processor 704 can obtain an FSK-modulated frequency from the CW light by Fourier transforming the extracted AC component. Further, the processor 704 can obtain a numerical value of a CW-light center frequency from the FSK-modulated frequency.

Although the measurement unit 336 can measure a center frequency when an OCM is used, it is not possible to measure the center frequency when a PEN monitor is used, so, as described above, frequency information is extracted from an AC component of a CW light modulated with an FSK-modulated frequency.

In this way, a center frequency of a CW light can be calculated by obtaining information on an FSK-modulated frequency from an AC component of the CW light modulated with an FSK-modulated frequency.

FIG. 13 is a flowchart that illustrates the example of the processing performed by the measurement device using an FSK-modulated frequency. The optical frequency controller 324 sets up the CW light source so that an FSK-modulated frequency modulation is performed (Step S201). The optical frequency controller 324 controls a center frequency of a CW light output from the CW light source 323 (Step S202). The CW light source 323 outputs the CW light (Step S203). The frequency modulator 322 and the polarization-modulator 321 perform modulation processing and polarization processing on the CW light, respectively (Step S204). The CW light modulated in the transmitter 320 is transmitted to the transmission path (Step S205).

The photodiode 701 of the receiver 700 detects a transmission optical power and an amplitude component ΔP, and an FSK-modulated frequency (Step S206). The processor 704 calculates transmission characteristics (Step S207). The processor 704 determines whether an average power is greater than a predetermined threshold (Step S208).

When the average power is greater than the predetermined threshold (YES in Step S208), the report unit 705 reports a slope of transmission characteristics (ΔP/Δf) to the optical frequency controller 324 (Step S209). On the basis of the slope of transmission characteristics (ΔP/Δf), the optical frequency controller 324 controls the amount of frequency change from the center frequency used in Step S102, and the FSK-modulated frequency (Step S210). When the process of Step S210 is terminated, the transmitter 320 repeats the processes from Step S201.

When the average power is less than the predetermined threshold (NO in Step S208), the report unit 705 reports to the optical frequency controller 324 that the measurement processing will be terminated (Step S211). When the process of Step S211 is terminated, the transmitter 320 and the receiver 700 terminate the processing.

All examples and conditional language provided herein are intended for the pedagogical purpose of aiding the reader in understanding the invention and the concepts contributed by the inventor to further the art, and are not to be construed as limitations to such specifically recited examples and conditions, nor does the organization of such examples in the specification related to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A measurement device that measures optical transmission characteristics, comprising:
    a transmitter configured to generate a frequency-modulated CW (continuous wave) light so as to transmit the CW light to a path; and
    a receiver configured to receive the CW light that has passed through passband filters included in the path, wherein
    the receiver includes
        a processor configured to measure an optical power of the received frequency-modulated CW light every time a center frequency of the CW light is changed and transmitted by the transmitter, and to calculate a change in the optical power and a change in amount of frequency that indicates a slope of the optical transmission characteristics of the CW light that has passed through the passband filters, on the basis of an average value of the optical power that corresponds to a center frequency of the CW light and on the basis of an amplitude component that indicates an amount of change in the optical power, the average value and the amplitude component being obtained as a result of the measurement, wherein
    the transmitter receives information on an amplitude component indicating an amount of change in the measured optical power from the receiver, makes a change width of a center frequency of the frequency-modulated CW light small when the amplitude component is large, and makes the change width of the center frequency of the frequency-modulated CW light large when the amplitude component is small.

2. The measurement device according to claim 1, wherein the transmitter uses a frequency modulated waveform to perform the frequency modulation, and the receiver determines, on the basis of the received frequency modulated waveform, whether an amount of change in the optical power is positive or negative, and changes the amount of change in the optical power to an additive inverse when a result of the determination is negative.

3. The measurement device according to claim 1, wherein the transmitter transmits light of an FM (frequency modulation) frequency.

4. A method for measuring optical transmission characteristics, the method comprising:
    generating, by a transmitter, a frequency-modulated CW (continuous wave) light so as to transmit the CW light to a path;
    measuring, by a processor in a receiver, an optical power of the frequency-modulated CW light received through passband filters included in the path every time a center frequency of the CW light is changed and transmitted;
    calculating, by the processor, a change in the optical power and a change in amount of frequency that indicates a slope of the optical transmission characteristics of the CW light that has passed through the passband filters, on the basis of an average value of the optical power that corresponds to a center frequency of the CW light and on the basis of an amplitude component that indicates an amount of change in the optical power, the average value and the amplitude component being obtained as a result of the measurement;
    receiving information on an amplitude component indicating an amount of change in the measured optical power from the receiver;
    making a change width of a center frequency of the frequency-modulated CW light small when the amplitude component is large; and
    making the change width of the center frequency of the frequency-modulated CW light large when the amplitude component is small.

5. The measurement method according to claim 4, comprising:
    using, by the transmitter, a frequency modulated waveform to perform the frequency modulation; determining, by the processor, on the basis of the frequency modulated waveform that has passed through the passband filters, whether an amount of change in the optical power is positive or negative; and changing, by the processor, a value of the amount of change in the optical power to an additive inverse when the value of the amount of change in the optical power is negative.

6. The measurement method according to claim 4, comprising:
    transmitting, by the transmitter, light of an FM (frequency modulation) frequency.

* * * * *